United States Patent
Lee

(10) Patent No.: US 9,519,193 B2
(45) Date of Patent: Dec. 13, 2016

(54) LIQUID CRYSTAL DISPLAY

(71) Applicant: SAMSUNG DISPLAY CO., LTD., Yongin, Gyeonggi-Do (KR)

(72) Inventor: Seung Jae Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/721,797

(22) Filed: May 26, 2015

(65) Prior Publication Data

US 2016/0011477 A1     Jan. 14, 2016

(30) Foreign Application Priority Data

Jun. 20, 2014    (KR) ......................... 10-2014-0076074

(51) Int. Cl.
*G02F 1/136*     (2006.01)
*G02F 1/1343*    (2006.01)

(52) U.S. Cl.
CPC ............... *G02F 1/134309* (2013.01); *G02F 2001/134372* (2013.01)

(58) Field of Classification Search
CPC ............... G02F 1/136286; G02F 1/134309
USPC .................................................... 349/43
See application file for complete search history.

(56) References Cited

U.S. PATENT DOCUMENTS

| 5,754,266 A * | 5/1998 | Ohta ................. G02F 1/133512 349/110 |
| 6,937,312 B2 * | 8/2005 | Kadotani .......... G02F 1/134363 345/100 |
| 2002/0149729 A1 * | 10/2002 | Nishimura ........ G02F 1/134363 349/141 |
| 2010/0225569 A1 | 9/2010 | Park et al. |

* cited by examiner

*Primary Examiner* — Lucy Chien
(74) *Attorney, Agent, or Firm* — Lewis Roca Rothgerber Christie LLP

(57) ABSTRACT

A liquid crystal display including a first substrate and a second substrate facing the first substrate, a gate line and a data line on the first substrate, a thin film transistor coupled to the gate line and the data line, a pixel electrode coupled to the thin film transistor, and a common electrode overlapping the pixel electrode with an insulating layer therebetween, and including a plurality of branch electrodes and a connector coupling the branch electrodes, the common electrode overlapping the data line and extending in parallel with the data line, wherein a width of the connector of the common electrode is about 8.0 μm to about 13.5 μm.

11 Claims, 7 Drawing Sheets

LIQUID CRYSTAL DISPLAY

CROSS-REFERENCE TO RELATED APPLICATION

This application claims priority to and the benefit of Korean Patent Application No. 10-2014-0076074, filed in the Korean Intellectual Property Office on Jun. 20, 2014, the entire content of which is incorporated herein by reference.

BACKGROUND

1. Field

Aspects of one or more embodiments of the present invention relate to a liquid crystal display.

2. Description of the Related Art

A liquid crystal display is currently one of the most widely used (or utilized) flat panel displays, and is a display device that adjusts an amount of transmitted light by applying a voltage to an electrode and rearranges liquid crystal molecules of a liquid crystal layer.

The liquid crystal display has a merit in that the liquid crystal display is easily manufactured to be thin, but has a drawback in that side visibility is poor compared to front visibility, and as a result, in order to overcome the drawback, various methods of arranging and driving the liquid crystal have been developed. A liquid crystal display, in which a pixel electrode and a common electrode are formed on one substrate, has attracted attention as a method of implementing a wide viewing angle.

However, regarding such liquid crystal display, liquid crystal molecules are rotated in a direction that is substantially horizontal (e.g., parallel) with regard to the substrate so a contrast ratio on its side may be lowered and light may leak through the side of the display.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed toward a liquid crystal display for reducing (e.g., preventing) light leakage through a side of the display without lowering a contrast ratio on its side, the liquid crystal display being formed with a pixel electrode and a common electrode on a substrate.

According to some embodiments of the present invention there is provided a liquid crystal display including: a first substrate and a second substrate facing the first substrate; a gate line and a data line on the first substrate; a thin film transistor coupled to the gate line and the data line; a pixel electrode coupled to the thin film transistor; and a common electrode overlapping the pixel electrode with an insulating layer therebetween, and including a plurality of branch electrodes and a connector coupling the branch electrodes, the common electrode overlapping the data line and extending in parallel with the data line, wherein a width of the connector of the common electrode is about 8.0 μm to about 13.5 μm.

In an embodiment, a first distance is between a first edge of the date line and a second edge of the connector nearest the first edge, the first distance being less than a second distance between the first edge and a third edge of the pixel electrode nearest the first edge.

In an embodiment, the third edge does not overlap the connector, and a third distance between the second edge and the third edge is less than about 3.0 μm.

In an embodiment, the pixel electrode has a planar shape, and the pixel electrode overlaps the branch electrodes.

In an embodiment, at least one of the branch electrodes extends in a direction substantially parallel with the gate line.

In an embodiment, a first distance is between a first edge of the data line and a second edge of the connector nearest the first edge, the first distance is greater than a second distance between the first edge and a third edge of the pixel electrode nearest the first edge.

In an embodiment, wherein the third edge of the pixel electrode overlaps the connector, and a third distance between the second edge and the third edge is less than about 1.25 μm.

In an embodiment, the pixel electrode has a planar shape, and the pixel electrode overlaps the branch electrodes.

In an embodiment, at least one of the branch electrodes extends in a direction substantially parallel with the gate line.

In an embodiment, the pixel electrode has a planar shape, and the pixel electrode overlaps the branch electrodes.

In an embodiment, at least one of the branch electrodes extends in a direction substantially parallel with the gate line.

Accordingly, in the liquid crystal display according to an example embodiment of the present invention, the contrast ratio on the side is not lowered and light leakage through the side of the display is reduced (e.g., prevented), the liquid crystal display being formed with the pixel electrode and the common electrode on a single substrate.

DETAILED DESCRIPTION

Figure 1:
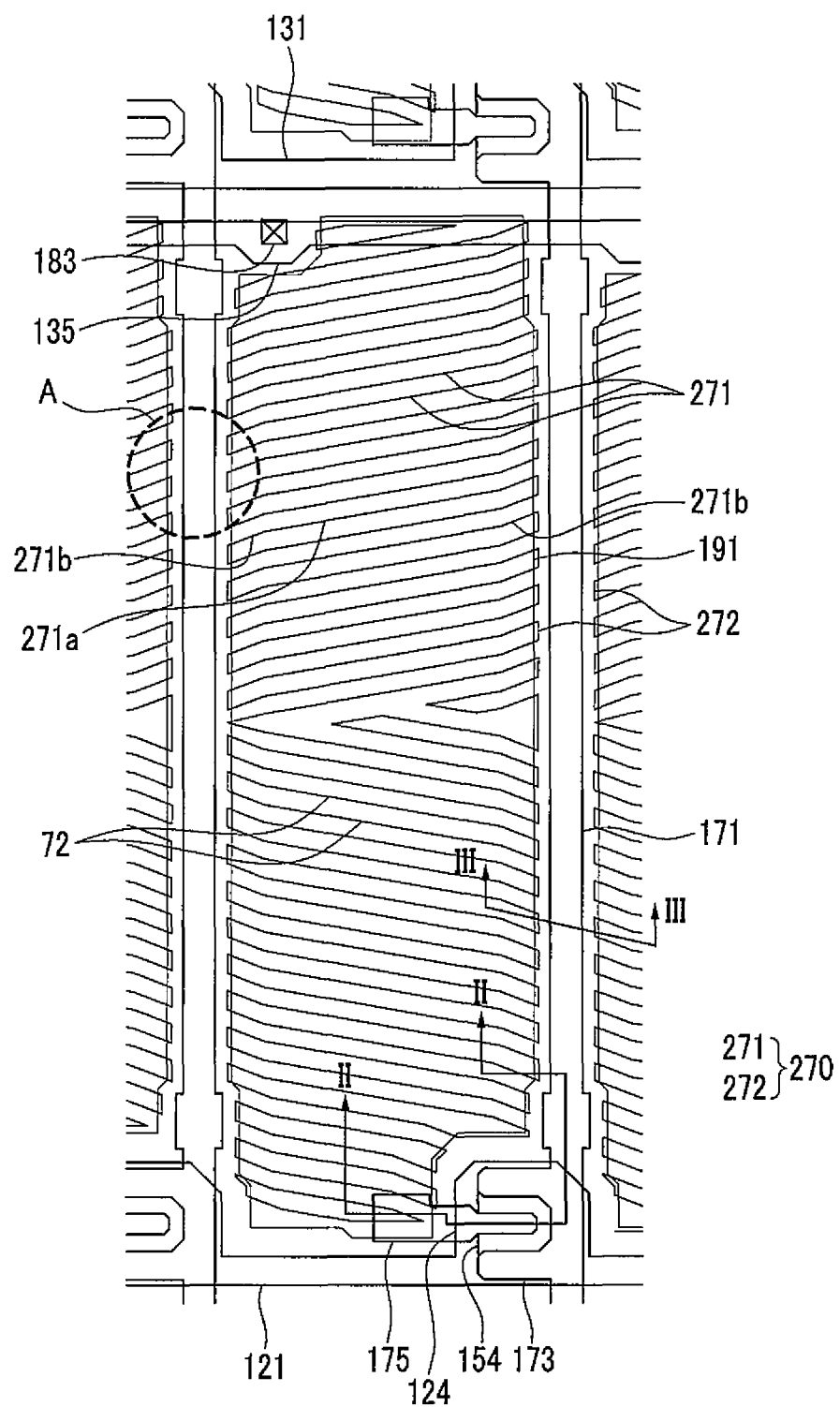
FIG. 1 shows a layout view of a liquid crystal display according to an example embodiment of the present invention.

The present invention will be described more fully hereinafter with reference to the accompanying drawings, in which example embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element, such as a layer, film, region, or substrate, is referred to as being "on" another element, it may be directly on the other element or intervening elements may also be present. In contrast, when an element is referred to as being "directly on" another element, there are no intervening elements present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept."

It will be understood that when an element or layer is referred to as being, "connected to", "coupled to", or "adjacent to" another element or layer, it can be directly connected to, coupled to, or adjacent to the other element or layer, or one or more intervening elements or layers may be present. As used herein, the term "substantially," "about," and similar terms are used as terms of approximation and not as terms of degree, and are intended to account for the inherent deviations in measured or calculated values that would be recognized by those of ordinary skill in the art.

A liquid crystal display according to an example embodiment of the present invention will now be described with reference to accompanying drawings.

Figure 2:
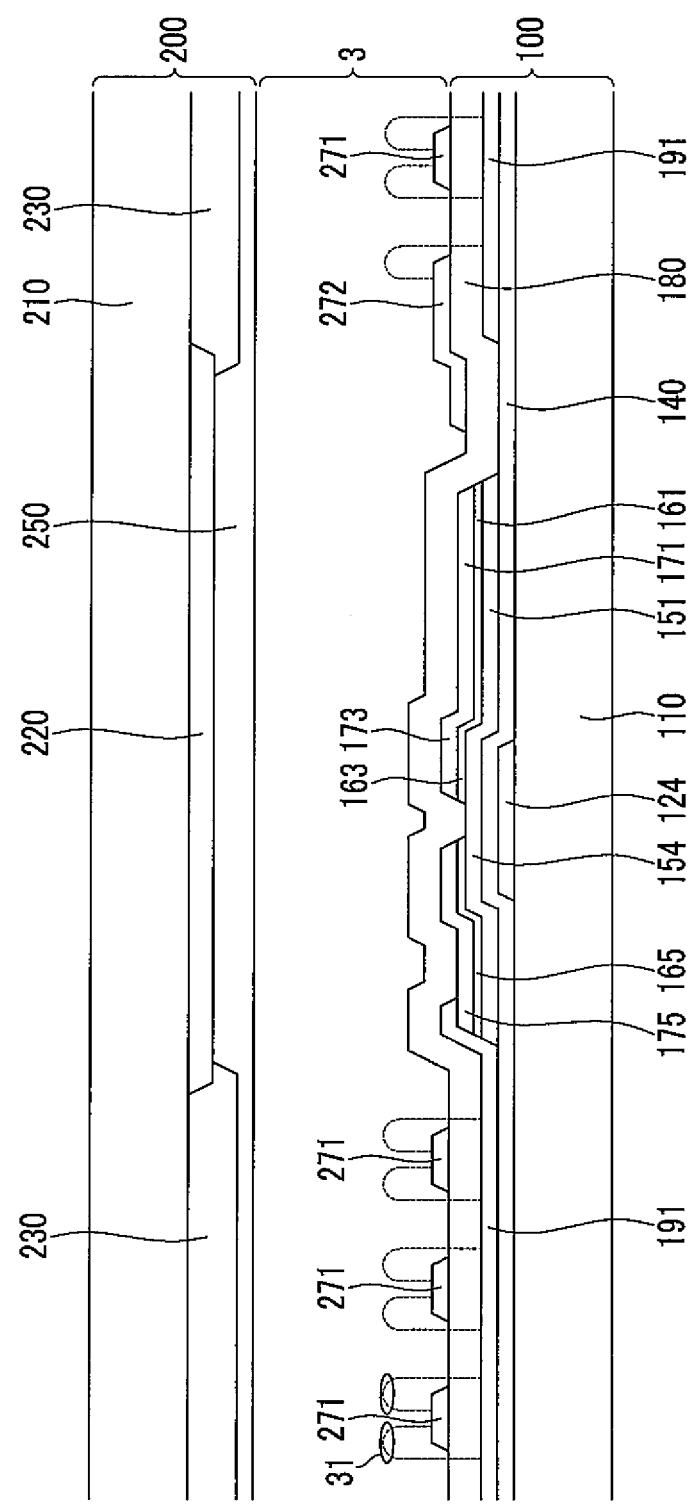
FIG. 2 shows a cross-sectional view of a liquid crystal display of FIG. 1 with respect to the line II-II.
Figure 3:
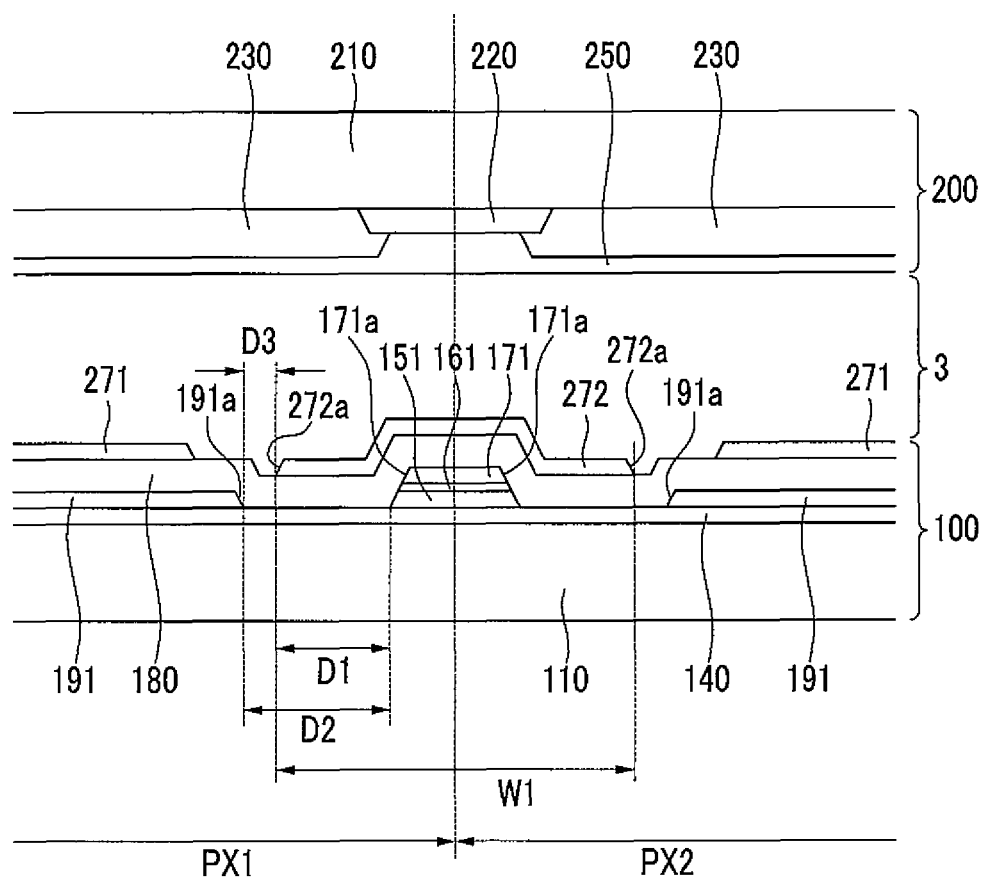
FIG. 3 shows a cross-sectional view of a liquid crystal display of FIG. 1 with respect to the line
Figure 4:
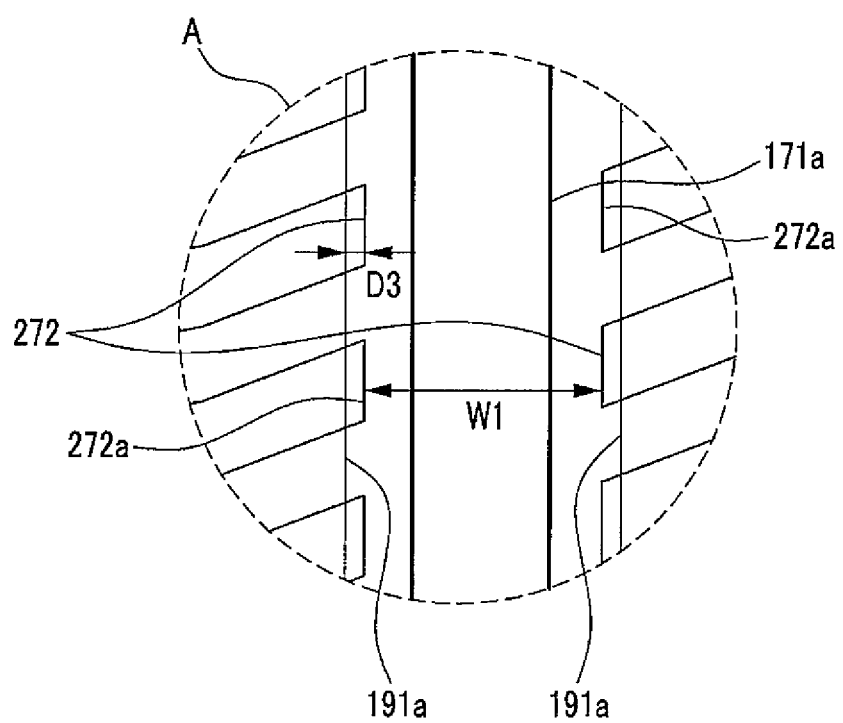
FIG. 4 shows an enlarged view of a part of a liquid crystal display of FIG. 1.

FIG. 1 shows a layout view of a liquid crystal display according to an example embodiment of the present invention. FIG. 2 shows a cross-sectional view of a liquid crystal display of FIG. 1 with respect to the line II-II. FIG. 3 shows a cross-sectional view of a liquid crystal display of FIG. 1 with respect to the line Referring to FIG. 1 to FIG. 3, the liquid crystal display includes a first display panel 100 and an upper panel 200 facing each other, and a liquid crystal layer 3 injected therebetween.

The first display panel 100 will now be described.

Gate conductors including a gate line 121 and a common voltage line 131 are formed on a first substrate 110 made of transparent glass, plastic, and/or the like. The gate line 121 includes a wide end portion for accessing a gate electrode 124 and another layer or an external driving circuit. The common voltage line 131 transmits a constant common voltage and includes a connector (e.g., an extension) 135 for accessing a common electrode 270 to be described. The common voltage line 131 is coupled to (e.g., connected to) the common electrode 270 and transmits the common voltage to the common electrode 270. The common voltage line 131 may be substantially parallel to (e.g., parallel to) the gate line 121 and may be formed with substantially the same material (e.g., same material) as the gate line 121.

A gate insulating layer 140 made of a silicon nitride (SiNx) and/or a silicon oxide (SiOx) is formed on the gate conductors (e.g., the gate line and common voltage line) 121 and 131. The gate insulating layer 140 may have a multilayered structure including at least two insulating layers having different physical properties.

A plurality of semiconductors 151 made of hydrogenated amorphous silicon (amorphous silicon is abbreviated as a-Si) or polysilicon are formed on the gate insulating layer 140. The semiconductors 151 are mainly extended in a horizontal direction (e.g., a direction parallel to the substrate), and include a plurality of first projections 154 extended toward the gate electrode 124.

A plurality of ohmic contacts 161, 163, and 165 are formed on the semiconductor 151. The ohmic contacts 161 and 165 may be made of n+ hydrogenated amorphous silicon doped with an n-type impurity at a high concentration, such as phosphorous, or of a silicide.

The first ohmic contact 161 includes a plurality of second projections 163 protruding toward the first projections 154 of the semiconductors 151, and the second projection 163 and the second ohmic contact 165 form a pair and are located on the first projections 154 of the semiconductors 151.

A plurality of data lines 171 and a plurality of drain electrodes 175 are formed on the ohmic contacts 161, 163, and 165 and the gate insulating layer 140.

The data line 171 transmits a data signal and is mainly extended in the horizontal direction to cross the gate line 121 and the common voltage line 131.

The data line 171 includes a wide end portion for accessing a plurality of source electrodes 173 extending toward the gate electrode 124 and another layer or an external driving circuit.

The data line 171 extends to a portion adjacent to the gate line 121 and the common voltage line 131 to reduce the likelihood of or prevent a short circuit.

The drain electrode 175 is separated from the data line 171 and faces the source electrode 173 with respect to the gate electrode 124.

The drain electrode 175 includes a bar-type end (e.g., bar-end) portion and a wide extension. The bar-type end portion is partially surrounded by a bent source electrode 173.

The gate electrode 124, the source electrode 173, and the drain electrode 175 form a thin film transistor (TFT) together with the first projection 154 of the semiconductor 151, and a channel of the thin film transistor is formed on the first projection 154 of the semiconductor 151 between the source electrode 173 and the drain electrode 175.

A pixel electrode 191 is formed on the extension of the drain electrode 175 and the gate insulating layer 140.

The pixel electrode 191 has an edge that is substantially parallel to the data line 171 and the gate line 121, and has a substantially quadrangular shape.

The pixel electrode 191 covers the extension of the drain electrode 175, is located thereon, and is physically and electrically coupled to (e.g., electrically connected to) the drain electrode 175.

The pixel electrode 191 may be made of a transparent conductive material such as polycrystalline, monocrystalline, or amorphous indium tin oxide (ITO) or indium zinc oxide (IZO).

A passivation layer 180 is formed on the data conductors (e.g., data lines and drain electrodes) 171 and 175, the first projection 154 of the exposed semiconductor 151, and the pixel electrode 191. The passivation layer 180 is made of an inorganic insulator, such as a silicon nitride and/or a silicon oxide. However, the passivation layer 180 may be made of an organic insulator and its surface may be flat. The organic insulator may have photosensitivity, and its dielectric constant may be less than about 4.0. The passivation layer 180 may have a dual-layer structure of a lower inorganic layer and an upper organic layer so that it may maintain excellent insulating characteristics of the organic layer and not damage the first projection 154 of the exposed semiconductor 151. Further, the passivation layer 180 may be a color filter, and in this case, an insulating layer is additionally formed on the passivation layer 180 to reduce the likelihood of or prevent the color filter component from being spread to the liquid crystal layer 3.

A contact opening (e.g., contact hole) for exposing an end portion of the data line 171 is formed in the passivation layer 180, and a contact opening 183 for exposing the connector 135 of the common voltage line 131 and a contact opening for exposing an end portion of the gate line 121 are formed in the passivation layer 180 and the gate insulating layer 140.

The common electrode 270 is formed on the passivation layer 180. The common electrode 270 overlaps the pixel electrode 191. The common electrode 270 has a plurality of cutouts 72, and includes a plurality of branch electrodes 271 defined by the cutouts 72 and a connector 272 overlapping the data line 171 and coupling (e.g., connecting) a plurality of branch electrodes 271.

The common electrode 270 is made of a transparent conductive material, such as polycrystalline, monocrystalline, or amorphous indium tin oxide (ITO), indium zinc oxide (IZO), and/or the like.

The branch electrode 271 of the common electrode 270 extends in a direction that is substantially parallel to the gate line 121, and may be inclined to have an angle of about 5 degrees to about 20 degrees with respect to the gate line 121. Further, the branch electrode 271 of the common electrode 270 may be inclined to have an angle of about 7 degrees to about 13 degrees with respect to a rubbing direction of an alignment layer to be described, and in further detail, about 10 degrees.

The branch electrode 271 of the common electrode 270 includes a first portion 271a extending in a direction (e.g., a predetermined direction), and a second portion 271b located near the connector 272 and located on respective ends of the first portion 271a.

The first portion 271a of the branch electrode 271 of the common electrode 270 may be at an angle of about 7 degrees to about 13 degrees (e.g., 10 degrees) with respect to the rubbing direction of the alignment layer, and the second portion 271b may be further bent so that it may be at an angle of about 15 degrees with respect to the first portion 271a.

The branch electrode 271 of the common electrode 270 is divided into the first portion 271a and the second portion 271b to change the direction of an electric field at a center portion and an edge portion of the pixel area. In general, the direction of an electric field is different at the end of the branch electrode 271 from the center portion of the branch electrode 271, such that the rotational direction of the liquid crystal molecules 31 becomes non-uniform and a texture may be caused when an electric field is applied to the liquid crystal layer 3. However, since the liquid crystal display according to an example embodiment of the present invention includes the second portion 271b, which is located at the end of the first portion 271a of the branch electrode 271 and curved at an angle that is greater than at the first portion 271a, it is possible to rotate the liquid crystal molecules 31 of the liquid crystal layer 3 in a particular direction (e.g., a predetermined direction) by changing the direction of the electric field applied to the liquid crystal layer 3. Further, the rotational direction may be determined when liquid crystal molecules 31 rotate by including the second portion 271b, which is curved at the angle that is greater than at the first portion 271a. Therefore, texture induced by irregular rotation of the liquid crystal molecule 31 on the right and left borders of the pixel area may be reduced (e.g., prevented). In addition, the branch electrode 271 of the common electrode 270 is divided into the first portion 271a and the second portion 271b to differently set the rotation angles of the liquid crystal molecule 31, and thereby increase a viewing angle of the liquid crystal display and compensate for a change in color tone.

Referring to FIG. 1 to FIG. 3, the common electrodes 270, located in neighboring pixel areas along a pixel row direction are coupled to each other by the connector 272, covers at least part of the data line 171.

The common electrode 270 is physically and electrically coupled to the common voltage line 131 through the contact opening 183 formed in the passivation layer 180 and the gate insulating layer 140.

An alignment layer is coated on the common electrode 270 and the passivation layer 180, and the alignment layer may be a horizontal alignment layer and is rubbed in a direction (e.g., a predetermined direction). The rubbing direction of the alignment layer may be formed to have an angle of about 10 degrees with respect to the direction in which the first portion 271a of the branch electrode of the common electrode 270 is extended.

The upper panel 200 will now be described.

A light blocking member 220 is formed on a second substrate 210 made of transparent glass or plastic. The light blocking member 220 is also called a black matrix, and it reduces (e.g., prevents) light leakage.

A plurality of color filters 230 are formed on the second substrate 210. Most of the color filters 230 are provided inside a region surrounded by the light blocking member 220, and may extend in a longitudinal direction along a column of the pixel electrode 191. Each of the color filters 230 may express one of three primary colors including red, green, and blue. When the passivation layer 180 of the first display panel 100 is a color filter, the color filter 230 formed on the second substrate 210 may be omitted and the light blocking member 220 may be formed on the first display panel 100.

An overcoat 250 is formed on the color filter 230 and the light blocking member 220. The overcoat 250 may be made of an (organic) insulating material, and reduces (e.g., prevents) exposure of the color filter 230 and provides a flat side. The overcoat 250 may be omitted.

The liquid crystal layer 3 has positive dielectric anisotropy or negative dielectric anisotropy, and includes a plurality of liquid crystal molecules 31 having a long-axis direction that is parallel to the display panels 100 and 200.

The pixel electrode 191 receives a data voltage from the drain electrode 175, and the common electrode 270 receives a common voltage (e.g., with a predetermined value) from the common voltage line 131.

The pixel electrode 191 to which the data voltage is applied generates an electric field together with the common voltage line 131 for receiving the common voltage so the liquid crystal molecules 31 of the liquid crystal layer 3 provided on the pixel electrode 191 and the common electrode 270 are rotated in a direction that is substantially parallel to (e.g., parallel to) the direction of the electric field. As described above, according to the determined rotation direction of the liquid crystal molecules 31, polarization of light passing through the liquid crystal layer is changed.

The pixel electrode 191 of the liquid crystal display according to the example embodiment of the present invention is located between the gate insulating layer 140 and the passivation layer 180, and it covers part of the drain electrode 175 to be physically and electrically coupled to the same so the aperture ratio is increased compared to the related art liquid crystal display coupled through the contact opening (e.g., contact hole).

The pixel electrode 191 and the common electrode 270 will now be described in more detail with reference to FIG. 3.

Referring to FIG. 3, a first width W1 of the connector 272 of the common electrode 270 overlapping the data line 171 provided between the two adjacent pixels, that is, the first pixel PX1 and the second pixel PX2, and coupling a plurality of branch electrodes 271 of the common electrode 270 provided on the first pixel PX1 and the second pixel PX2, may be about 8.0 μm to about 13.5 μm. The first width W1 represents a width of the connector 272 that is measured in a direction that is parallel to the gate line 121.

When the first width W1 of the connector 272 of the common electrode 270 is formed as described above to fully cover the data line 171, unneeded coupling between the pixel electrode 191 and the data line 171 provided to the adjacent pixels PX1 and PX2 may be reduced (e.g., prevented), and deterioration of (e.g., reduction of) display quality that may occur by the unneeded coupling may be mitigated (e.g., prevented). Deterioration of display quality occurring on the edge of the pixel electrode 191 leads to reduction of the contrast ratio on the side. However, according to the example embodiment of the present invention, deterioration of display quality occurring on the edge of the pixel electrode 191 may be reduced to mitigate (e.g., prevent) deterioration of (e.g., reduction of) the contrast ratio on the side of the liquid crystal display.

Referring to FIG. 3, a first distance D1 between a second edge 272a of the connector 272 of the nearest common electrode 270 with respect to the first edge 171a of the data line 171 and a first edge 171a of the data line 171 is less than a second distance D1 between a third edge 191a of the nearest pixel electrode 191 with respect to the first edge 171a and the first edge 171a. The connector 272 of the common electrode 270 does not overlap the third edge 191a of the pixel electrode 191 with respect to top and bottom, and the pixel electrode 191 overlaps the branch electrode 271 of the common electrode 270. Therefore, the liquid crystal molecules 31 of the liquid crystal layer 3 located at the position that corresponds to the third edge 191a of the pixel electrode 191 are sufficiently influenced by a fringe field occurring between the pixel electrode 191 and the common electrode 270, and the liquid crystal molecules 31 are limited or prevented from being poorly controlled on the third edge 191a of the pixel electrode 191. When the liquid crystal molecules 31 are not well controlled, light may leak, and, according to the present example embodiment, deterioration of (e.g., reduction of) display quality such as light leakage that may occur on the third edge 191a of the pixel electrode 191 may be mitigated (e.g., prevented) by reducing (e.g., preventing) poor controlling of the liquid crystal molecules 31 on the third edge 191a of the pixel electrode 191.

Further, the third distance D3 between the second edge 272a of the common electrode 270 and the third edge 191a of the pixel electrode 191 may be less than about 3.0 μm. When the third distance D3 is formed to be large, the aperture ratio of the liquid crystal display may be reduced. However, according to the example embodiment of the present invention, the third distance D3 is formed to be less than about 3.0 μm, the area in which the pixel electrode 191 is formed is not unnecessarily reduced, and deterioration of (e.g., reduction of) the aperture ratio of the liquid crystal display may be mitigated (e.g., prevented).

That is, deterioration of the aperture ratio of the liquid crystal display may be mitigated (e.g., prevented) while reducing (e.g., preventing) deterioration of display quality, such as deterioration of (e.g., reduction of) the contrast ratio and light leakage on the side of the liquid crystal display.

Figure 5:
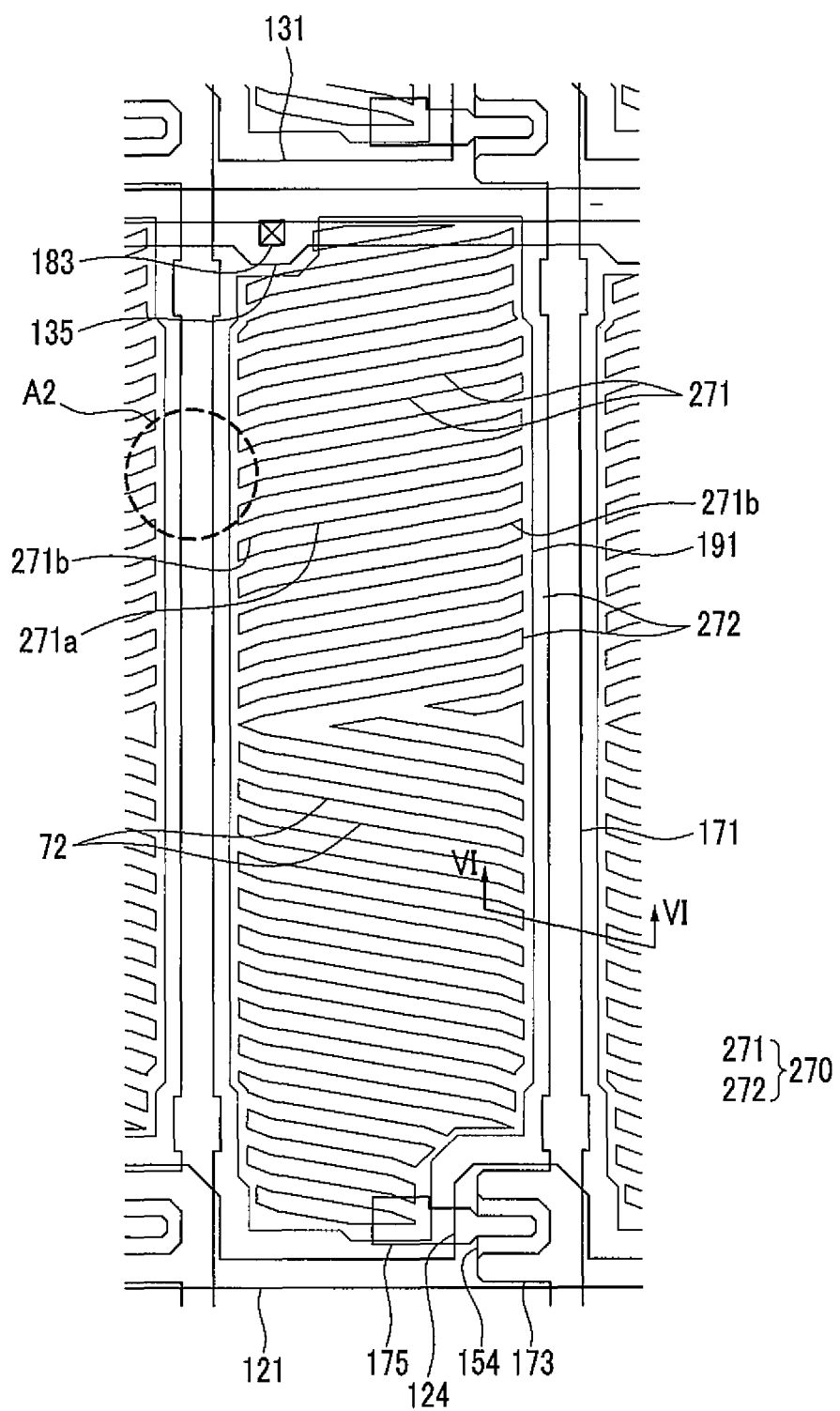
FIG. 5 shows a layout view of a liquid crystal display according to another example embodiment of the present invention.
Figure 6:
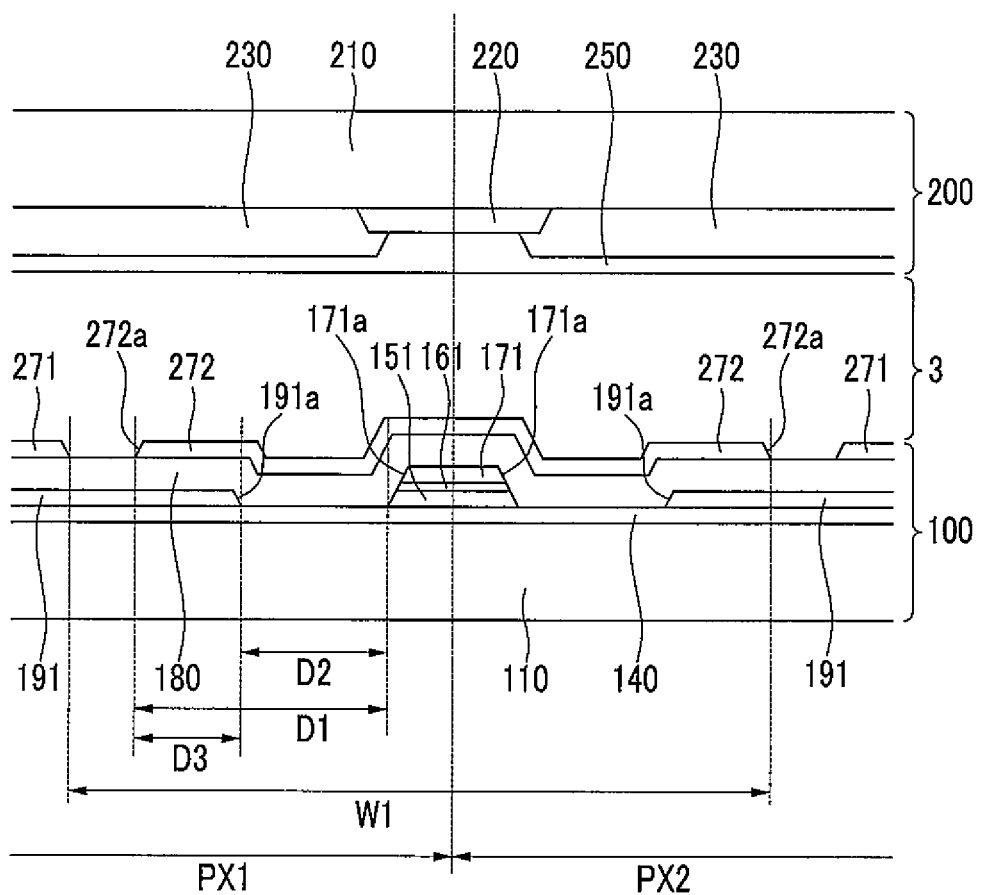
FIG. 6 shows a cross-sectional view of a liquid crystal display of FIG. 5 with respect to the line VI-VI.
Figure 7:
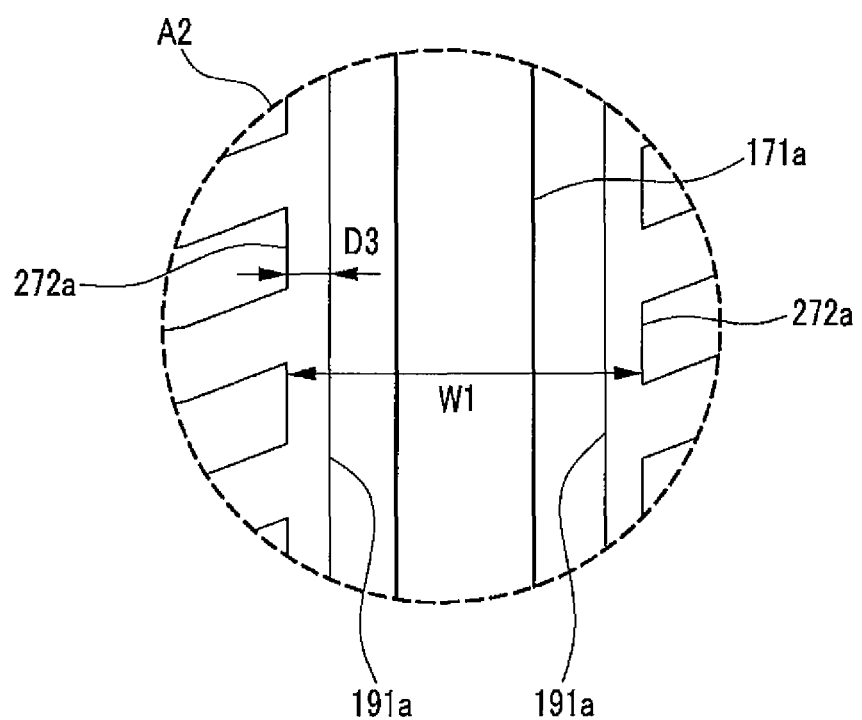
FIG. 7 shows an enlarged view of a part of a liquid crystal display of FIG. 6.

A liquid crystal display according to another example embodiment of the present invention will now be described with reference to FIG. 5 to FIG. 7. FIG. 5 shows a layout view of a liquid crystal display according to another example embodiment of the present invention. FIG. 6 shows a cross-sectional view of a liquid crystal display of FIG. 5 with respect to the line VI-VI. FIG. 7 shows an enlarged view of a part of a liquid crystal display of FIG. 6.

Referring to FIG. 5 to FIG. 7, the liquid crystal display according to the present example embodiment is similar to the liquid crystal display according to the example embodiment described with reference to FIG. 1 to FIG. 4.

The liquid crystal display according to the present example embodiment includes a first display panel 100 and an upper panel 200 facing each other and a liquid crystal layer 3 injected therebetween.

The first display panel 100 will now be described.

A gate line 121 and a common voltage line 131 are formed on a first substrate 110, and a gate insulating layer 140 is formed on gate conductors 121 and 131.

A semiconductor 151 is formed on the gate insulating layer 140. The semiconductor 151 includes a plurality of first projection 154 extending toward a gate electrode 124.

A plurality of ohmic contacts 161, 163, and 165 are formed on the semiconductor 151.

A plurality of data lines 171 and a plurality of drain electrodes 175 are formed on the ohmic contacts 161, 163, and 165 and the gate insulating layer 140.

The data line 171 transmits a data signal and mainly extends in the horizontal direction (e.g., the direction parallel to the substrate) to cross (e.g., perpendicular to the extension direction of) the gate line 121 and the common voltage line 131.

The data line 171 includes a plurality of source electrodes 173 extending toward the gate electrode 124. The drain electrode 175 is separated from the data line 171 and faces the source electrode 173 with respect to the gate electrode 124.

A pixel electrode 191 is formed on an extension of the drain electrode 175 and the gate insulating layer 140.

The pixel electrode 191 has an edge that is substantially parallel to the data line 171 and the gate line 121, and has a substantially quadrangular shape.

The pixel electrode 191 covers the extension of the drain electrode 175, is located thereon, and is physically and electrically coupled to the drain electrode 175.

A passivation layer 180 is formed on the data conductors 171 and 175, an exposed portion of the first projection 154 of the semiconductor 151, and the pixel electrode 191.

A contact opening for exposing an end portion of the data line 171 is formed in the passivation layer 180, and a contact opening 183 for exposing the connector 135 of the common voltage line 131 and a contact opening for exposing an end portion of the gate line 121 are formed in the passivation layer 180 and the gate insulating layer 140.

A common electrode 270 is formed on the passivation layer 180. The common electrode 270 overlaps the pixel electrode 191. The common electrode 270 has a plurality of cutouts 72, and includes a plurality of branch electrodes 271 defined by the cutouts 72 and a connector 272 overlapping the data line 171 and coupling a plurality of branch electrodes 271.

The branch electrode 271 of the common electrode 270 includes a first portion 271a extending in a direction (e.g., a predetermined direction), and a second portion 271b located near the connector 272 and located on respective ends of the first portion 271a.

The common electrodes 270 located in neighboring pixel areas along a pixel row direction are coupled to each other by the connector 272, and the connector 272 covers at least part of the data line 171.

The common electrode 270 is physically and electrically coupled to the common voltage line 131 through the contact opening 183 formed in the passivation layer 180 and the gate insulating layer 140.

An alignment layer is coated on the common electrode 270 and the passivation layer 180, and the alignment layer may be a horizontal alignment layer and is rubbed in a direction (e.g., a predetermined direction).

The upper panel 200 will now be described.

A light blocking member 220 is formed on a second substrate 210 made of transparent glass, plastic, and/or the like.

A plurality of color filters 230 are formed on the second substrate 210.

An overcoat 250 is formed on the color filter 230 and the light blocking member 220.

The liquid crystal layer 3 has positive dielectric anisotropy or negative dielectric anisotropy, and includes a plurality of liquid crystal molecules 31 having a long-axis direction that is parallel to the display panels (e.g., first display panel and upper panel) 100 and 200.

The pixel electrode 191 receives a data voltage from the drain electrode 175, and the common electrode 270 receives a common voltage with a value (e.g., a predetermined value) from the common voltage line 131.

The pixel electrode 191 to which the data voltage is applied generates an electric field together with the common voltage line 131 for receiving the common voltage so the liquid crystal molecules 31 of the liquid crystal layer 3 provided on the electrodes 191 and 270 are rotated in a direction that is substantially parallel to the direction of the electric field. As described above, according to the determined rotation direction of the liquid crystal molecules 31, polarization of light passing through the liquid crystal layer is changed.

The pixel electrode 191 of the liquid crystal display according to the example embodiment of the present invention is located between the gate insulating layer 140 and the passivation layer 180 and it covers part of the drain electrode 175 to be physically and electrically coupled to the same so the aperture ratio is increased compared to the related art liquid crystal display coupled through the contact opening.

The pixel electrode 191 and the common electrode 270 will now be described in more detail with reference to FIG. 7.

Referring to FIG. 7, the connector 272 of the common electrode 270 overlaps the data line 171 provided between the adjacent first pixel PX1 and the second pixel PX2, and connects a plurality of branch electrodes 271 of the common electrode 270 provided to the first pixel PX1 and the second pixel PX2. A first width W1 of the connector 272 of the common electrode 270 may be about 8.0 μm to about 13.5 μm. The first width W1 represents a width of the connector 272 that is measured in a direction that is substantially parallel to (e.g., parallel to) the gate line 121.

According to the example embodiment of the present invention, when the first width W1 of the connector 272 of the common electrode 270 is formed as described above to fully cover the data line 171, unneeded coupling between the pixel electrode 191 and the data line 171 provided to the adjacent pixels PX1 and PX2 may be reduced (e.g., prevented), and deterioration (e.g., reduction of) of display quality that may occur by the unneeded coupling may be mitigated (e.g., prevented). Hence, reduction of the contrast ratio on the side of the liquid crystal display may be mitigated (e.g., prevented).

Referring to FIG. 7, a first distance D1 between a second edge 272a of the connector 272 of the nearest common electrode 270 with respect to the first edge 171a of the data line 171 and a first edge 171a of the data line 171 is greater than a second distance D1 between a third edge 191a of the nearest pixel electrode 191 with respect to the first edge 171a and the first edge 171a. That is, the second edge 272a of the common electrode 270 overlaps the third edge 191a of the pixel electrode 191 with respect to the top and the bottom. As described, when the second edge 272a of the common electrode 270 and the third edge 191a of the pixel electrode 191 are formed to overlap each other, the area of the region in which the pixel electrode 191 is formed is increased. Therefore, deterioration of (e.g., reduction of) the aperture ratio of the liquid crystal display may be mitigated (e.g., prevented).

The third distance D3 between the second edge 272a of the common electrode 270 and the third edge 191a of the pixel electrode 191 may be less than about 1.25 μm. When the third distance D3 is formed to be large, a distance between the third edge 191a of the pixel electrode 191 and the branch electrode 271 of the common electrode 270 is increased, and it may be less influenced by the fringe field generated by the liquid crystal branch electrode 271 that corresponds to the third edge 191a of the pixel electrode 191. In this case, the liquid crystal molecules 31 may not rotate in a desired direction near the third edge 191a of the pixel electrode 191, so light may leak around the third edge 191a of the pixel electrode 191, and such light leakage reduces the contrast ratio on the side of the liquid crystal display. However, according to the example embodiment of the present invention, the third distance D3 between the second edge 272a of the common electrode 270 and the third edge 191a of the pixel electrode 191 is less than about 1.25 μm, thereby increasing the aperture ratio of the liquid crystal display, reducing (e.g., preventing) light leakage that may occur around the third edge 191a of the pixel electrode 191, and mitigating (e.g., preventing) reduction of the contrast ratio on the side of the liquid crystal display.

That is, according to the example embodiment of the present invention, the contrast ratio on the side of the liquid crystal display is not deteriorated, display quality such as light leakage is not deteriorated, and the aperture ratio of the liquid crystal display is not deteriorated.

While this invention has been described in connection with what is presently considered to be practical example embodiments, it is to be understood that the invention is not limited to the disclosed embodiments, but, on the contrary, is intended to cover various suitable modifications and equivalent arrangements included within the spirit and scope of the appended claims, and equivalents thereof.

What is claimed is:

1. A liquid crystal display comprising:
    a first substrate and a second substrate facing the first substrate;
    a gate line and a data line on the first substrate;
    a thin film transistor coupled to the gate line and the data line;
    a pixel electrode coupled to the thin film transistor; and
    a common electrode overlapping the pixel electrode with an insulating layer therebetween, and comprising a plurality of branch electrodes and a connector coupling the branch electrodes, the common electrode overlapping the data line and extending in parallel with the data line, the plurality of branch electrodes extending along a same direction that is different from an extension direction of the connector and being between the gate line and an adjacent gate line,
    wherein a width of the connector of the common electrode is about 8.0 µm to about 13.5 µm.

2. The liquid crystal display of claim 1, wherein
    a first distance is between a first edge of the date line and a second edge of the connector nearest the first edge, the first distance being less than a second distance between the first edge and a third edge of the pixel electrode nearest the first edge.

3. A liquid crystal display comprising:
    a first substrate and a second substrate facing the first substrate;
    a gate line and a data line on the first substrate;
    a thin film transistor coupled to the gate line and the data line;
    a pixel electrode coupled to the thin film transistor; and
    a common electrode overlapping the pixel electrode with an insulating layer therebetween, and comprising a plurality of branch electrodes and a connector coupling the branch electrodes, the common electrode overlapping the data line and extending in parallel with the data line,
    wherein a width of the connector of the common electrode is about 8.0 µm to about 13.5 µm,
    wherein a first distance is between a first edge of the date line and a second edge of the connector nearest the first edge, the first distance being less than a second distance between the first edge and a third edge of the pixel electrode nearest the first edge,
    wherein the third edge does not overlap the connector, and
    wherein a third distance between the second edge and the third edge is less than about 3.0 µm.

4. The liquid crystal display of claim 3, wherein
    the pixel electrode has a planar shape, and the pixel electrode overlaps the branch electrodes.

5. The liquid crystal display of claim 4, wherein
    at least one of the branch electrodes extends in a direction substantially parallel with the gate line.

6. The liquid crystal display of claim 1, wherein
    a first distance is between a first edge of the data line and a second edge of the connector nearest the first edge, the first distance is greater than a second distance between the first edge and a third edge of the pixel electrode nearest the first edge.

7. A liquid crystal display comprising:
    a first substrate and a second substrate facing the first substrate;
    a gate line and a data line on the first substrate;
    a thin film transistor coupled to the gate line and the data line;
    a pixel electrode coupled to the thin film transistor; and
    a common electrode overlapping the pixel electrode with an insulating layer therebetween, and comprising a plurality of branch electrodes and a connector coupling the branch electrodes, the common electrode overlapping the data line and extending in parallel with the data line,
    wherein a width of the connector of the common electrode is about 8.0 µm to about 13.5 µm,
    wherein a first distance is between a first edge of the data line and a second edge of the connector nearest the first edge, the first distance is greater than a second distance between the first edge and a third edge of the pixel electrode nearest the first edge,
    wherein the third edge of the pixel electrode overlaps the connector, and
    wherein a third distance between the second edge and the third edge is less than about 1.25 µm.

8. The liquid crystal display of claim 7, wherein
    the pixel electrode has a planar shape, and the pixel electrode overlaps the branch electrodes.

9. The liquid crystal display of claim 8, wherein
    at least one of the branch electrodes extends in a direction substantially parallel with the gate line.

10. The liquid crystal display of claim 1, wherein
    the pixel electrode has a planar shape, and the pixel electrode overlaps the branch electrodes.

11. The liquid crystal display of claim 1, wherein
    at least one of the branch electrodes extends in a direction substantially parallel with the gate line.

* * * * *